Patented Sept. 1, 1925.

1,552,341

UNITED STATES PATENT OFFICE.

PAUL POETSCHKE, OF MILFORD, DELAWARE, ASSIGNOR TO THE L. D. CAULK COMPANY, OF MILFORD, DELAWARE, A CORPORATION OF DELAWARE.

DENTAL CEMENT AND PROCESS OF MAKING SAME.

No Drawing.   Application filed September 13, 1921. Serial No. 500,352.

*To all whom it may concern:*

Be it known that I, PAUL POETSCHKE, a citizen of the United States, residing at Milford, in the county of Sussex and State of Delaware, have invented new and useful Improvements in Dental Cements and Processes of Making Same, of which the following is a specification.

My invention relates particularly to cement adapted to be used in the art of dentistry and is especially directed to a type of cement which may be used for setting inlays, facings, crowns and bridges and for filling cavities in the natural teeth.

The principal object of my invention is to provide a new cement of the kind described and a process of producing it, which cement combines certain advantages possessed by the silicate and zinc oxyphosphate cements now used in dental practice.

Other objects of my invention are to provide a dental cement which is extremely hard and resistant to mechanical abrasion and which is pure white, opaque or semi-translucent, and which may be tinted or colored to produce any desired shade so as to simulate the natural dentin in color and appearance.

My invention also comprehends a cement powder which when combined with a suitable liquid yields a plastic mass having the desired adhesive qualities for cementing inlays, facings, crowns and bridges and which will not generate any appreciable amount of heat in setting.

The cements which are now offered for sale to the dental profession consist of two principal types known respectively as the silicate and zinc oxyphosphate cements. While there are other types of dental cement such as copper cement and zinc oxychloride cement the present invention bears no relation to these.

Dental cement consists of a powder and a liquid which are mixed by the dentist when required for use. The powder of the silicate cements consists principally of alumino-calcium-silicate, whereas the powder of the zinc oxyphosphate cements consists principally of calcined zinc oxide. The liquids with which the different types of powder are mixed are substantially alike and consist of an aqueous solution of orthophosphoric acid containing aluminum or zinc phosphates.

Silicate cements are used principally for fillings in anterior teeth because they simulate the natural teeth in translucency and color. They are not used for cementation of inlays, facings, crowns and bridges because they lack the adhesive qualities and working properties of the zinc oxyphosphates. The silicate cements show a greater resistance to erosion than the zinc oxyphosphates but are too translucent and not sufficiently adhesive for cementing inlays, porcelain crowns and facings. On the other hand, the zinc oxyphosphates, while extensively used for cementing inlays, porcelain crowns and facings are too opaque and do not have the desired shades for this class of work.

After considerable research and experimentation I have found that a properly prepared combination of zinc oxide and silica when mixed with the usual dental cement liquid, comprising aqueous orthophosphoric acid containing modifiers such as aluminum or zinc phosphates, yields a cement having the above mentioned characteristics of whiteness, extreme hardness, semi-opacity, and adhesiveness. Another characteristic of my combination of zinc oxide and silica is that it combines readily with a dilute aqueous solution of phosphoric acid, yielding a solid colloid gel, and when mixed with the usual dental cement liquid to form a plastic mass, by the process familiar to dentists as spatulation, it sets, producing a hard vitreous cement.

I have found that a compound of silica and zinc, which occurs in nature and is known as willemite and having the composition $Zn_2SiO_4$, will produce a cement having some of the desired characteristics, but the supply of the natural mineral in a sufficient degree of purity is limited. I, therefore, prepare the zinc oxide and silica compound by starting with pure powdered zinc oxide and pure finely ground silica. These materials I mix to a paste with distilled water which I then dry and calcine at a red heat for the proper length of time. The resulting calcined product, after cooling, may then be treated in any well known way, as by grinding and bolting, to form the dental cement powder. The temperature and time of calcination depend upon the particular composition used. As an example, I may mix 27 parts by weight of silica with 73 parts by weight of zinc oxide, although the proportions may be varied within wide limits. For instance, suitable types of cement may be produced by using 15 parts by weight of silica and 85 parts by weight of zinc oxide, or I may employ 40 parts by weight of silica and 60 parts by weight of zinc oxide. In place of zinc oxide I may use zinc fluoride in equivalent quantities or a mixture of zinc oxide and zinc fluoride.

In order to increase the rate of hardening of the cement, I may add a suitable alkaline earth metal fluoride, preferably calcium fluoride to the mixture of zinc oxide and silica, the amount added depending upon the rate of hardening desired. For example, I may use 27 parts of silica, 73 parts of zinc oxide and 10 parts of calcium fluoride.

For increasing the densification of the mixture in calcination, I may add certain compounds such as aluminum sodium fluoride or bismuth subnitrate. For example, I may add five per cent of aluminum sodium fluoride or one per cent of bismuth subnitrate to the zinc oxide and silica mixture employed.

It will be understood by those familiar with the art of dental cement manufacture that a salt of zinc, such as the nitrate, may be employed instead of zinc oxide because the acid radicle is driven off during calcination.

Instead of preparing the zinc oxide and silica compound by the aforementioned process, I may produce it by precipitating a solution of a zinc salt such as zinc sulphate with a solution of sodium silicate, subsequently washing the precipitated zinc silicate with distilled water, drying and calcining it with or without the addition of metallic oxides or the modifying agents previously mentioned and reducing it to a fine powder in the usual or any well known way. The compound prepared in this manner has the characteristic property of yielding a solid colloidal jelly when treated with a dilute aqueous solution of phosphoric acid.

While I have specifically mentioned zinc oxide, it will be understood by those familiar with the art of producing dental cement that other metallic oxides or metallic nitrates having the property of combining with silica under heat may be used to partially replace zinc oxide, and that the ratio of silica to zinc oxide may be varied within wide limits, depending upon the concentration, and type of cement liquid employed.

I am aware that silicate of zinc produced by precipitation but without subsequent calcination or direct combination of silica and zinc oxide under heat, has been heretofore proposed, and also that zinc oxide heated with aluminum phosphate has been previously proposed. The present invention, however, differs essentially therefrom as it comprehends calcining or heating zinc oxide and silica, the resulting combination producing a compound which breaks up upon treatment with acids, yielding a colloidal jelly. This compound may be used with or without hardening or densifying agents or other additions.

Having thus described my invention, I claim:—

1. A dental cement powder comprising a compound composed of calcined zinc silicate capable of reacting with an acid to yield a zinc salt and colloidal silicic acid.

2. A dental cement powder comprising a compound composed of calcined zinc silicate and a densifying agent.

3. A dental cement powder comprising a compound composed of calcined zinc silicate and a fluoride.

4. A dental cement powder comprising a compound composed of calcined precipitated zinc silicate and an alkaline earth metal fluoride.

5. A dental cement powder comprising a compound composed of calcined zinc silicate and a hardening agent.

6. A dental cement powder comprising a compound composed of acid soluble calcined zinc silicate.

7. A dental cement powder comprising a compound composed of calcined zinc silicate and calcium fluoride.

8. A dental cement powder comprising a compound composed of calcined zinc silicate, a hardening agent and a densifying agent.

9. A dental cement powder comprising a compound composed of calcined zinc silicate which is decomposable by an acid.

10. A dental cement powder comprising a compound composed of calcined zinc silicate and decomposable by an acid to form a colloidal jelly.

11. The process of producing a dental cement powder which comprises calcining a mixture of zinc oxide and silica to form a compound which is decomposable by an acid to form a colloidal jelly.

12. The process of producing a dental cement powder which comprises calcining a mixture of zinc oxide, silica and a fluoride.

13. The process of producing a dental cement powder which comprises calcining a mixture of zinc oxide, silica and alkaline earth metal fluoride.

14. The process of producing a dental cement powder which comprises calcining a mixture of zinc oxide, silica and calcium fluoride.

15. The process of producing a dental cement powder which comprises calcining a mixture of zinc oxide, silica and a densifying agent.

16. The process of producing a dental cement powder which comprises calcining a mixture of zinc oxide, silica, a hardening agent, and a densifying agent.

17. The process of producing a dental cement powder which comprises combining zinc oxide and silica by calcination to form a compound decomposable by an acid.

18. The process of producing a dental cement powder which comprises calcining zinc oxide, silica and a hardening agent.

19. The process of producing a dental cement powder which comprises calcining precipitated zinc silicate to form a compound decomposable by an acid.

20. The process of producing a dental cement powder which comprises calcining a mixture of precipitated zinc silicate and a fluoride.

21. The process of producing a dental cement powder which comprises calcining precipitated zinc silicate to form a compound which is decomposable by phosphoric acid to yield a colloidal jelly.

22. A dental cement powder comprising a compound composed of calcined zinc silicate and decomposable by phosphoric acid.

In testimony whereof I have hereunto set my hand.

PAUL POETSCHKE.